(12) United States Patent
Hsu et al.

(10) Patent No.: US 10,606,744 B2
(45) Date of Patent: Mar. 31, 2020

(54) METHOD FOR ACCESSING FLASH MEMORY MODULE AND ASSOCIATED FLASH MEMORY CONTROLLER AND ELECTRONIC DEVICE

(71) Applicant: Silicon Motion Inc., Hsinchu County (TW)

(72) Inventors: Ting-Fong Hsu, Taoyuan (TW); Po-Tsang Chen, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 38 days.

(21) Appl. No.: 15/859,738

(22) Filed: Jan. 2, 2018

(65) Prior Publication Data

US 2019/0121726 A1   Apr. 25, 2019

(30) Foreign Application Priority Data

Oct. 20, 2017   (TW) .............................. 106136049 A

(51) Int. Cl.
*G06F 12/02* (2006.01)

(52) U.S. Cl.
CPC ...... *G06F 12/0246* (2013.01); *G06F 12/0253* (2013.01); *G06F 2212/1016* (2013.01); *G06F 2212/7201* (2013.01); *G06F 2212/7205* (2013.01); *G06F 2212/7209* (2013.01)

(58) Field of Classification Search
CPC ..... G06F 12/0246–0276; G06F 2212/70–7211
See application file for complete search history.

(56) References Cited

U.S. PATENT DOCUMENTS

| 9,323,667 | B2 * | 4/2016 | Bennett | G06F 12/0292 |
| 2010/0115188 | A1 * | 5/2010 | Lee | G06F 12/0246 |
| | | | | 711/103 |
| 2011/0029715 | A1 * | 2/2011 | Hu | G06F 12/0246 |
| | | | | 711/103 |
| 2011/0238629 | A1 | 9/2011 | Post | |
| 2011/0238886 | A1 * | 9/2011 | Post | G06F 12/0246 |
| | | | | 711/103 |
| 2012/0311298 | A1 | 12/2012 | Post | |

(Continued)

FOREIGN PATENT DOCUMENTS

| CN | 107038131 A | 8/2017 |
| CN | 107240420 A | 10/2017 |

(Continued)

*Primary Examiner* — Nicholas J Simonetti
(74) *Attorney, Agent, or Firm* — Winston Hsu

(57) ABSTRACT

The present invention provides a method for accessing a flash memory module, wherein the method comprises: building a physical block recording table corresponding to a logical address to physical address (L2P) mapping table, wherein the physical block recording table records at least one block whose physical address is recorded in the L2P mapping table; and when a specific block within the flash memory module is under a garbage collection operation, for a data page of the specific block whose logical address is within the L2P mapping table, referring to the physical block recording table to determine if reading the L2P mapping table from the flash memory module or not, for determining the data page to be valid or invalid.

18 Claims, 9 Drawing Sheets

(56) References Cited

U.S. PATENT DOCUMENTS

| | | | |
|---|---|---|---|
| 2013/0080687 A1* | 3/2013 | Nemazie | G06F 12/0246 |
| | | | 711/103 |
| 2013/0198438 A1* | 8/2013 | Masuo | G06F 12/0246 |
| | | | 711/103 |
| 2015/0178190 A1 | 6/2015 | Fisher | |
| 2017/0228154 A1 | 8/2017 | Liu | |
| 2017/0277588 A1 | 9/2017 | Kim | |

FOREIGN PATENT DOCUMENTS

| | | |
|---|---|---|
| TW | I592800 B | 7/2017 |
| TW | 201732832 A | 9/2017 |

\* cited by examiner

| Logical address | Physical address |
|---|---|
| LBA_0 | |
| LBA_1 | |
| LBA_2 | |
| ..... | |
| LBA_255 | |

310_1

| Block | B_0 | B_1 | B_2 | ..... | B_M |
|---|---|---|---|---|---|
| Status | 0 | 0 | 0 | ..... | 0 |

320_1

| Logical address | Physical address |
|---|---|
| LBA_256 | |
| LBA_257 | |
| LBA_258 | |
| ..... | |
| LBA_511 | |

310_2

| Block | B_0 | B_1 | B_2 | ..... | B_M |
|---|---|---|---|---|---|
| Status | 0 | 0 | 0 | ..... | 0 |

| Block | B_0~B_9 | B_10~B_19 | B_20~B_29 | ...... | B_(M-9)~B_M |
|---|---|---|---|---|---|
| Status | 1 | 0 | 0 | ...... | 0 |

METHOD FOR ACCESSING FLASH MEMORY MODULE AND ASSOCIATED FLASH MEMORY CONTROLLER AND ELECTRONIC DEVICE

BACKGROUND OF THE INVENTION

1. Field of the Invention

The present invention relates to a flash memory module, and more particularly, to a method for accessing a flash memory module and related flash memory module.

2. Description of the Prior Art

When storage space in a flash memory module is insufficient, a flash memory controller will perform a garbage collection operation to move data from active data pages in multiple blocks to new blocks, and erase the contents of the original blocks to release more storage space. However, in the above operation, since it is necessary to correctly determine the valid data page and the invalid data page in each block, it has to store the relevant address information in advance for the comparison judgment. However, as the size of the blocks increases and number of the data pages in the blocks also increase, the data amount of the above-mentioned address information is greatly increased, and a large number of invalid reading/determining operations are often performed, thereby affecting the storage space in the flash memory module and the processing efficiency of the flash memory controller.

SUMMARY OF THE INVENTION

Therefore, an object of the present invention is to provide a method for accessing a flash memory module, which can significantly reduce invalid reading/determining operations and efficiently determine the data page of each specific block to be valid or invalid, to solve the above-mentioned problem.

According to a first aspect of the present invention, an exemplary method for accessing a flash memory module is disclosed. The method comprises: building a physical block recording table corresponding to a logical address to physical address (L2P) mapping table, wherein the physical block recording table records at least one block whose physical address is recorded in the L2P mapping table; and when a specific block within the flash memory module is under a garbage collection operation, for a data page of the specific block whose logical address is within the L2P mapping table, referring to the physical block recording table to determine if reading the L2P mapping table from the flash memory module or not, for determining the data page to be valid or invalid.

According to a second aspect of the present invention, an exemplary flash memory controller is disclosed, wherein the flash memory controller is utilized to access a flash memory module. The flash memory controller comprises: a read-only memory (ROM), a microprocessor, and a memory. The ROM is utilized for storing a code. The microprocessor is utilized for executing the code to control access to the flash memory module. The memory is utilized for storing a physical block recording table corresponding to an L2P mapping table, wherein the physical block recording table records at least one block whose physical address is recorded in the L2P mapping table; wherein when a specific block within the flash memory module is under a garbage collection operation, for a data page of the specific block whose logical address is within the L2P mapping table, referring to the physical block recording table to determine if reading the L2P mapping table from the flash memory module or not, for determining the data page to be valid or invalid.

According to a third aspect of the present invention, an exemplary electronic device is disclosed. The electronic device comprises: a flash memory module and a flash memory controller. The flash memory controller is utilized for accessing the flash memory module, wherein the flash memory controller builds a physical block recording table corresponding to an L2P mapping table, wherein the physical block recording table records at least one block whose physical address is recorded in the L2P mapping table; and when a specific block within the flash memory module is under a garbage collection operation, for a data page of the specific block whose logical address is within the L2P mapping table, referring to the physical block recording table to determine if reading the L2P mapping table from the flash memory module or not, for determining the data page to be valid or invalid.

Briefly summarized, the method for accessing a flash memory module of the present invention can build a physical block recording table corresponding to each L2P mapping table, to indicate blocks whose physical addresses are recorded in each L2P mapping table by using a small amount of data, so as to reduce the ineffective reading of the L2P mapping table from the flash memory module during the garbage collection to efficiently determine the data page to be valid or invalid, and enhance the efficiency of the flash memory controller.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a diagram illustrating two L2P mapping tables and corresponding physical block recording tables.

FIG. 9 is a diagram illustrating a physical block recording table according to an embodiment of the present invention.

DETAILED DESCRIPTION

Figure 1:
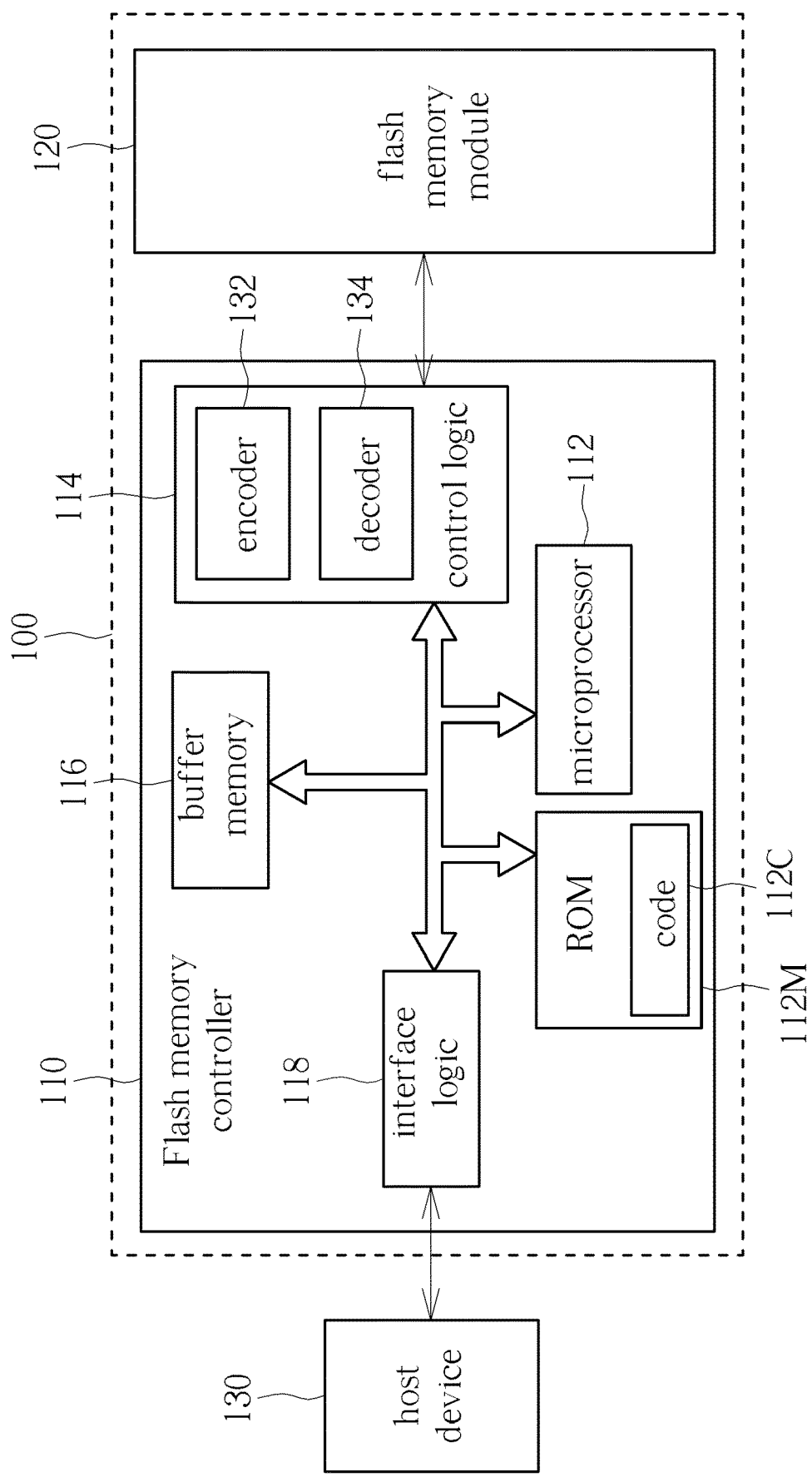
FIG. 1 is a diagram illustrating a memory device according to an embodiment of the present invention.

Please refer to FIG. 1. FIG. 1 is a diagram illustrating a memory device 100 according to an embodiment of the present invention. The memory device 100 comprises a flash memory module 120 and a flash memory controller 110, and the flash memory controller 110 is utilized to access the flash memory module 120. According to this embodiment, the flash memory controller 110 comprises a microprocessor 112, a read-only memory (ROM) 112M, a control logic 114, a buffer memory 116, and an interface logic 118. The ROM 112M is utilized to store a code 112C, and the microprocessor 112 is utilized to execute the code 112C to control the access to the flash memory module 120. The control logic 114 comprises an encoder 132 and a decoder 134, wherein the encoder 132 is utilized for encoding the data written in the flash memory module 120~produce a corresponding check code (or error correction (ECC), and the decoder 134 is utilized for decoding the data read from the flash memory module 120.

In a typical situation, the flash memory module 120 comprises a plurality of flash memory chips, and each flash memory chip comprises a plurality of blocks, and the data erasing operation for the flash memory module 120 by the controller (e.g., the flash memory controller 110 executing the code 112C via the microprocessor 112) is performed in units of blocks. In addition, a block may record a specific number of data pages (data pages) in which the data writing operation for the flash memory module 120 by the controller (e.g., the flash memory controller 110 executing the code 112C via the microprocessor 112) is performed to write in units of data pages. In this embodiment, the flash memory module 120 is a three-dimensional NAND type flash memory (3D NAND-type flash).

In practice, the flash memory controller 110 executing the code 112C via the microprocessor 112, can perform a number of control operations by using its own internal components, such as controlling the flash memory module 120 by using the control logic 114 (especially the access operations for at least one block or at least one data page), buffering the required buffering operations by using the buffer memory 116, and using the interface logic 118 to communicate with a host device 130. The buffer memory 116 is implemented in a random access memory (RAM). For example, the buffer memory 116 can be a static random access memory (SRAM), but the present invention is not limited thereto.

In an embodiment, the memory device 100 can be a portable memory device (e.g., a memory card that complies with to the SD/MMC, CF, MS, XD standard), and the host device 130 can be an electronic device capable of connecting to the memory device, such as cell phones, laptops, desktops, etc. In another embodiment, the memory device 100 can be a solid-status hard disk or an embedded storage that complies with Universal Flash Storage (UFS) or Embedded Multi Media Card (EMMC) specification, which is provided in an electronic device, such as in a mobile phone, a notebook computer, a desktop computer, and the host device 130 can be a processor of the electronic device.

Figure 2:
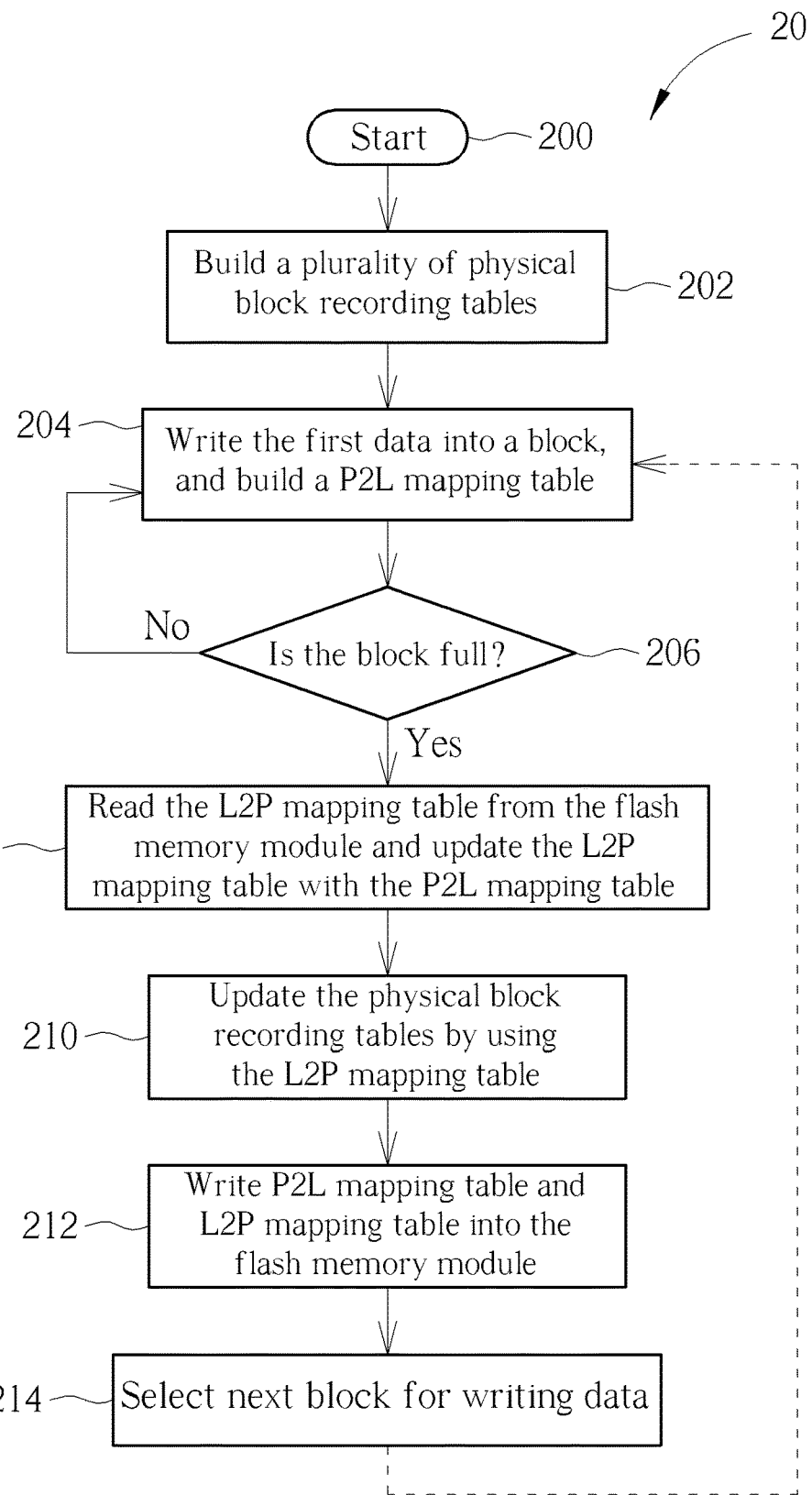
FIG. 2 is a flow chart of accessing the flash memory module according to an embodiment of the present invention.

Please refer to FIG. 2. FIG. 2 is a flow chart of accessing the flash memory module 120 according to an embodiment of the present invention. In the step 200, the flow starts. In the step 202, the microprocessor 112 builds a plurality of corresponding physical block recording tables for each logical address to physical address mapping table (hereinafter referred to as an L2P mapping table), wherein the physical block recording table records at least one block whose physical address is recorded in the L2P mapping table 120. For example, please refer to FIG. 3, which schematically illustrates two L2P mapping tables 310_1, 310_2 and corresponding physical block recording tables 320_1, 320_2. In FIG. 3, the L2P mapping table 310_1 has consecutive logical addresses LBA_0~LBA_255 and corresponding physical addresses, and the L2P mapping table 310_2 has consecutive logical addresses LBA_256 to LBA_511 and corresponding physical addresses. Assuming the current flash memory module 120 does not have written data of the logical addresses LBA_0~LBA_511, so no physical address information is recorded in the L2P mapping tables 310_1 and 310_2. It is to be noted that in this embodiment, the ordinal numbers of the logical addresses represent their order, and the consecutive ordinal numbers represent the consecutive logical addresses. In addition, assuming that the flash memory module 120 comprises a plurality of blocks B_0~B_M, then the physical block recording table 320_1 records the status of each of the blocks B_0~B_M in the flash memory module 120, so as to indicate whether or not the L2P mapping table 310_1 records the physical address of the block. In this embodiment, the status of each block is represented by two digit values of one bit, wherein the digit value "0" indicates that the L2P mapping table 310_1 does not record the physical address of the block, and the digital value "1" indicates that the L2P mapping table 310_1 records the physical address of the block. Similarly, the physical block recording table 320_2 also records the status of each of the blocks B_0~B_M in the flash memory module 120, which is utilized to indicate whether or not the L2P mapping table 310_2 records the physical address of the block. In FIG. 3, since it is assumed that no physical address information is recorded in the L2P mapping tables 310_1 and 310_2, so the status of the B_0~B_M of each of the blocks recorded in the physical block recording table 320_1, 320_2 are all "0".

In the step 204, the flash memory controller 110 receives at least one write command from the host device 130 to write the first data into a block of the flash memory module 120. In this embodiment, referring to FIG. 4, the flash memory module 120 comprises a plurality of flash memory chips 410, 420, each of which comprises a plurality of blocks B_0~B_M, and each block comprises N data pages P0~PN. In the following description, the flash memory controller 110 sequentially writes the data to the block B_0 of the flash memory chip 410. However, it should be noted that the above-mentioned "block" also can be a plurality of blocks (generally referred to as "super blocks") located in different planes and comprising multiple chips. For example, assuming that the flash memory chips 410, 420 comprise two planes, and the blocks B_0 and B_M are located on different planes, then the blocks B_0, B_M of the flash memory chip 410 and the blocks B_0, B_M of the flash memory chip 420 can constitute a super block.

Before the data is written to the block B_0, the microprocessor 112 creates a physical address to a logical address mapping table (hereinafter referred to as a P2L mapping table) 400 and stores it in the buffer memory 116, wherein the P2L mapping table 400 comprises physical addresses of the consecutive data pages P0~PN in the block B_0 and the corresponding logical addresses. In detail, the flash memory controller 110 first writes the data from the host device 130 and having the logical address LBA_5 into the data page P0, and then sequentially writes the data from the host device 130 with the logical addresses LBA_500, LBA_350, LBA_6, LBA_7, LBA_100 to the data pages P1 to P5, respectively. It is to be noted that in this embodiment, the ordinal number of the physical address represents its order, and the consecutive sequence numbers represent the consecutive physical addresses.

Figure 5:
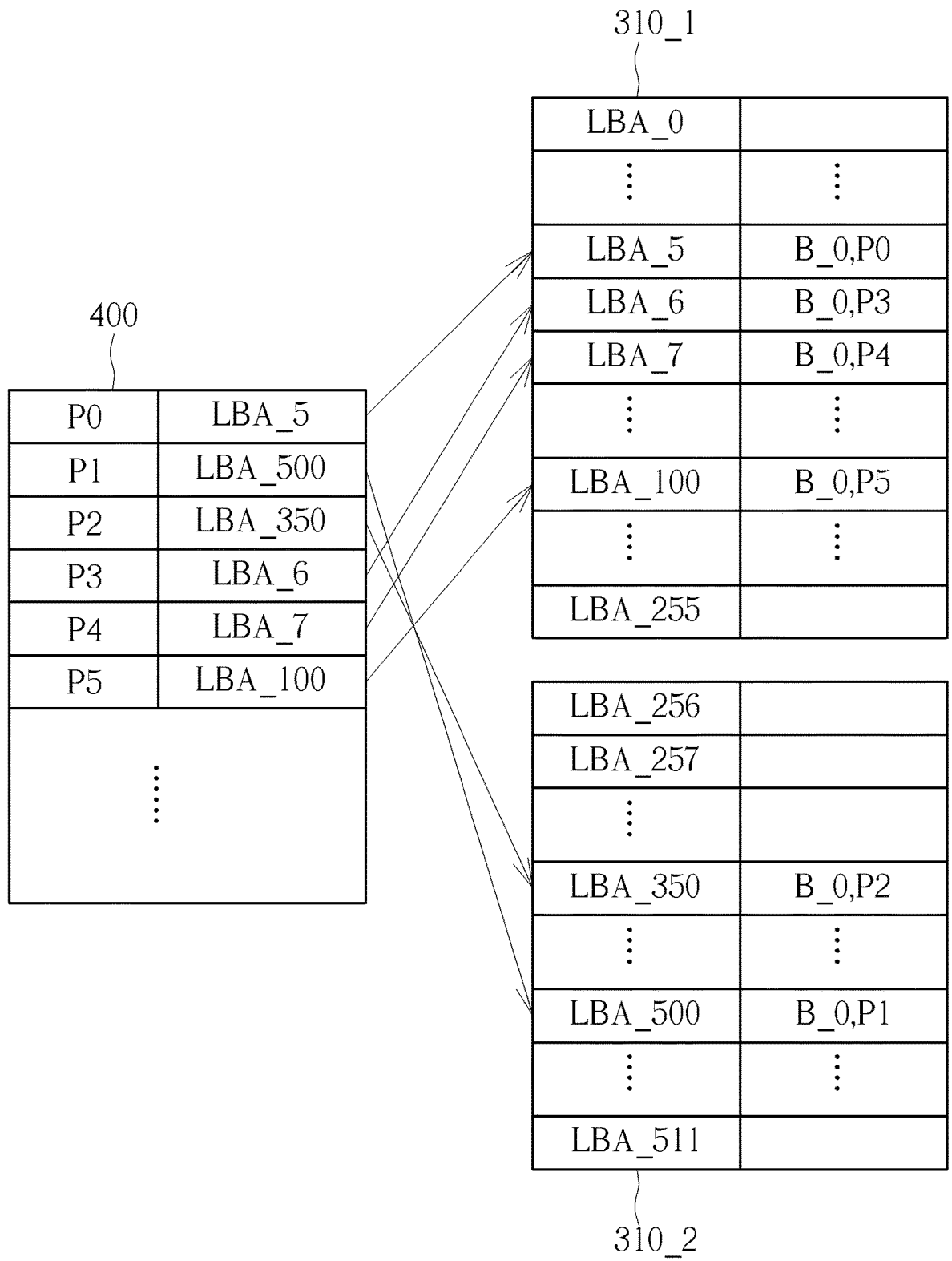
FIG. 5 is a diagram illustrating updating the L2P mapping table by using the P2L mapping table according to an embodiment of the present invention.

Next, in the step 206, the microprocessor 112 determines whether the last data page PN in the block B_0 has completed the data writing (i.e., the block B_0 has been fulfilled), and if not, then the flow proceeds to the step 204 to continue writing the next data to block B_0; if the last data page PN has completed the data writing, then the flow proceeds to the step 208. In the step 208, the microprocessor 112 reads a part of the L2P mapping table in the flash memory module 120 with reference to the contents of the P2L mapping table 400 and updates the contents of the read L2P mapping table by using the P2L mapping table 400. Specifically, the logical addresses LBA_5, LBA_500, LBA_350, LBA_6, LBA_7 and LBA_100 recorded in the P2L mapping table 400 are located in the logical address ranges LBA_0~LBA_255 and the logical address range LBA_256~LBA_511, and thus the microprocessor 112 reads two L2P control tables 310_1, 310_2 shown in FIG. 5 from the flash memory module 120. Next, since there are 4 pieces of information corresponding to the logical address range LBA_0~LBA_255 in the P2L table 400, the microprocessor 112 makes the logical address LBA_5 in the L2P mapping table 310_1 updated to the data page corresponding to the data page P0 of the block B_0, the logical address LBA_6 updated to the data page P3 corresponding to the block B_0, the logical address LBA_7 updated to the data page P4 corresponding to the block B_0, and the logical address LBA_100 updated to the data page P5 corresponding to the block B_0. In addition, since there are 2 pieces of information corresponding to the logical address range LBA_256 to LBA_511 in the P2L table 400, the microprocessor 112 makes the logical address LBA_350 in the L2P mapping table 310_2 updated to the data corresponding to the block B_0 Data page P2, and the logical address LBA_500 updated to the data page P1 corresponding to the block B_0.

In the step 210, the microprocessor 112 updates the physical block recording tables 320_1, 320_2 by using the updated L2P mapping tables 310_1, 310_2. Please refer to FIG. 6. Since the updated L2P mapping table 310_1, 310_2 both have the physical address of the recording block B_0, the microprocessor 112 updates the physical block recording table 320_1, 320_2 to change the status of the block B_0 to be "1".

In the step 212, the microprocessor 112 stores the P2L mapping table 400 and the updated L2P mapping tables 310_1, 310_2 into the flash memory module 120 and deletes the P2L mapping table 400 and the updated L2P mapping tables 310_1, 310_2 from the buffer memory 116.

Figure 7:
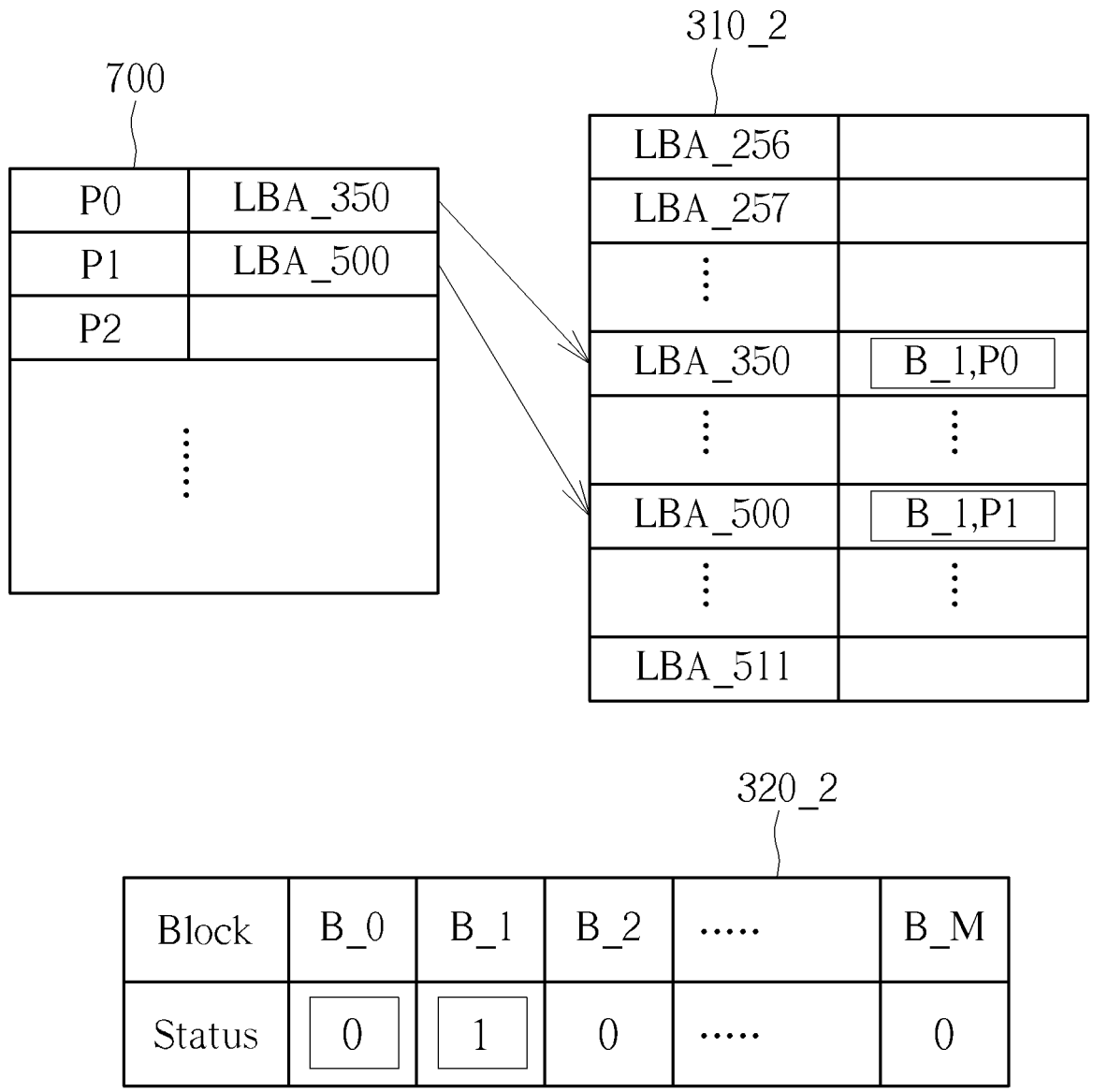
FIG. 7 is a diagram illustrating updating the L2P mapping table again by using the P2L mapping table according to an embodiment of the present invention.

In the step 214, the flash memory controller 110 selects the next block (e.g., block B_1) for subsequent data writing, and the flow returns to the step 204. In an embodiment, if the flow returns to the step 204 and the flash memory controller 110 receives the write command of the host device 130 to update the data having the logical addresses LBA_350 and LBA_500, then please refer to FIG. 7. The microprocessor 112 additionally creates the P2L mapping table 700 for the block B_1 and reads and updates the L2P mapping table 310_2 from the flash memory module 120 to update the logical addresses LBA_350, LBA_500 to be corresponding to the data page P0, P1 of the block B_1 and then be returned to the flash memory module 120. In addition, since the updated L2P mapping table 310_2 comprises the physical address of the block B_1, the status of the block B_1 in the physical block recording table 320_2 is updated to be "1", and since the updated L2P mapping table 310_2 does not comprise the physical address of the block B_0, the status of the block B_1 in the physical block recording table 320_2 is updated to be "0".

In the above embodiment, the physical block recording tables 320_1 and 320_2 are resident in the buffer memory 116, that is, after the flash memory controller 110 is powered up, the physical block recording tables 320_1 and 320_2 will be stored in the buffer memory 116 and updated in real time while the contents of the L2P mapping table 310_1, 310_2 are changed.

Figure 4:
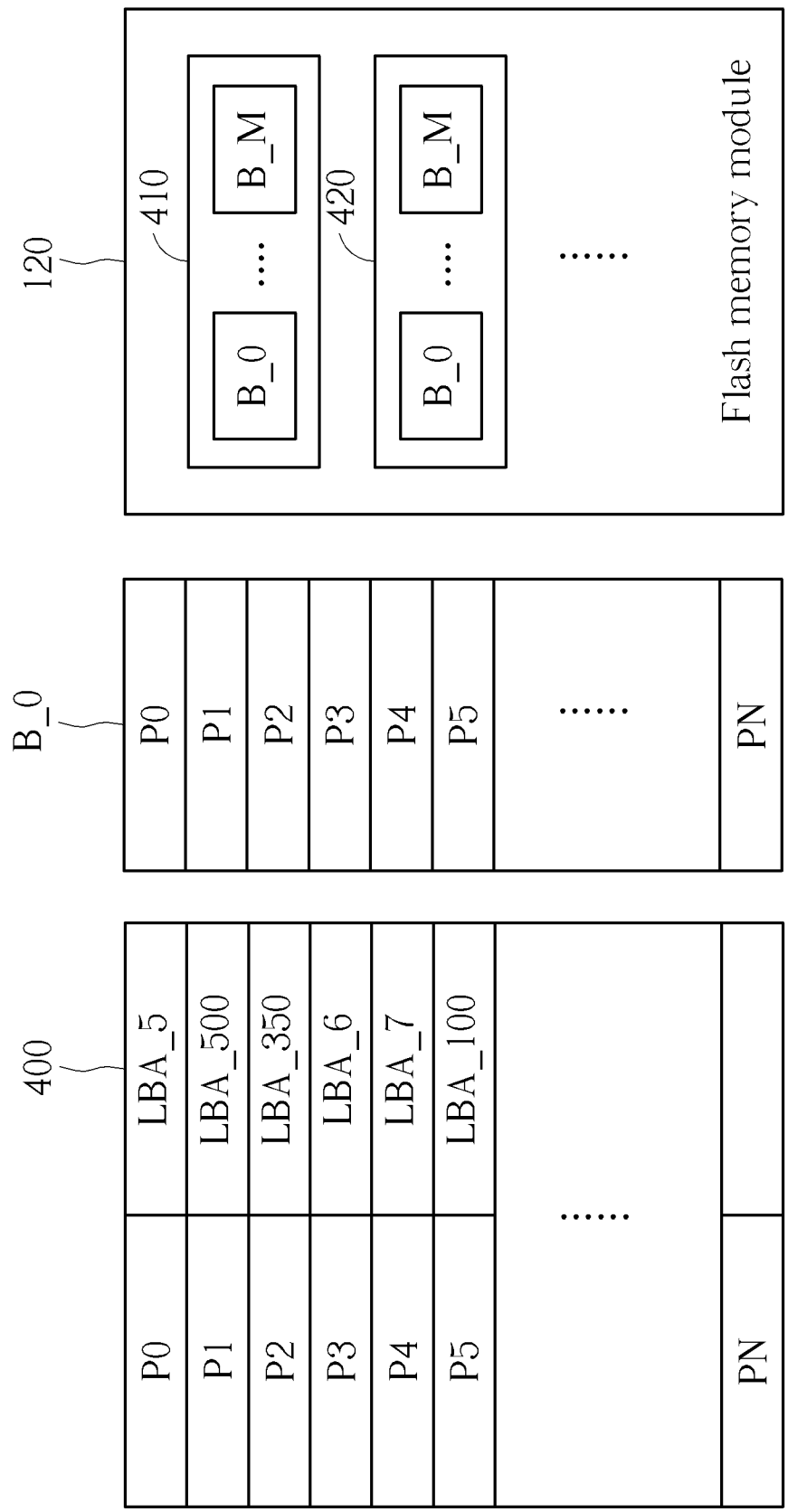
FIG. 4 is a diagram illustrating a P2L mapping table.
Figure 8:
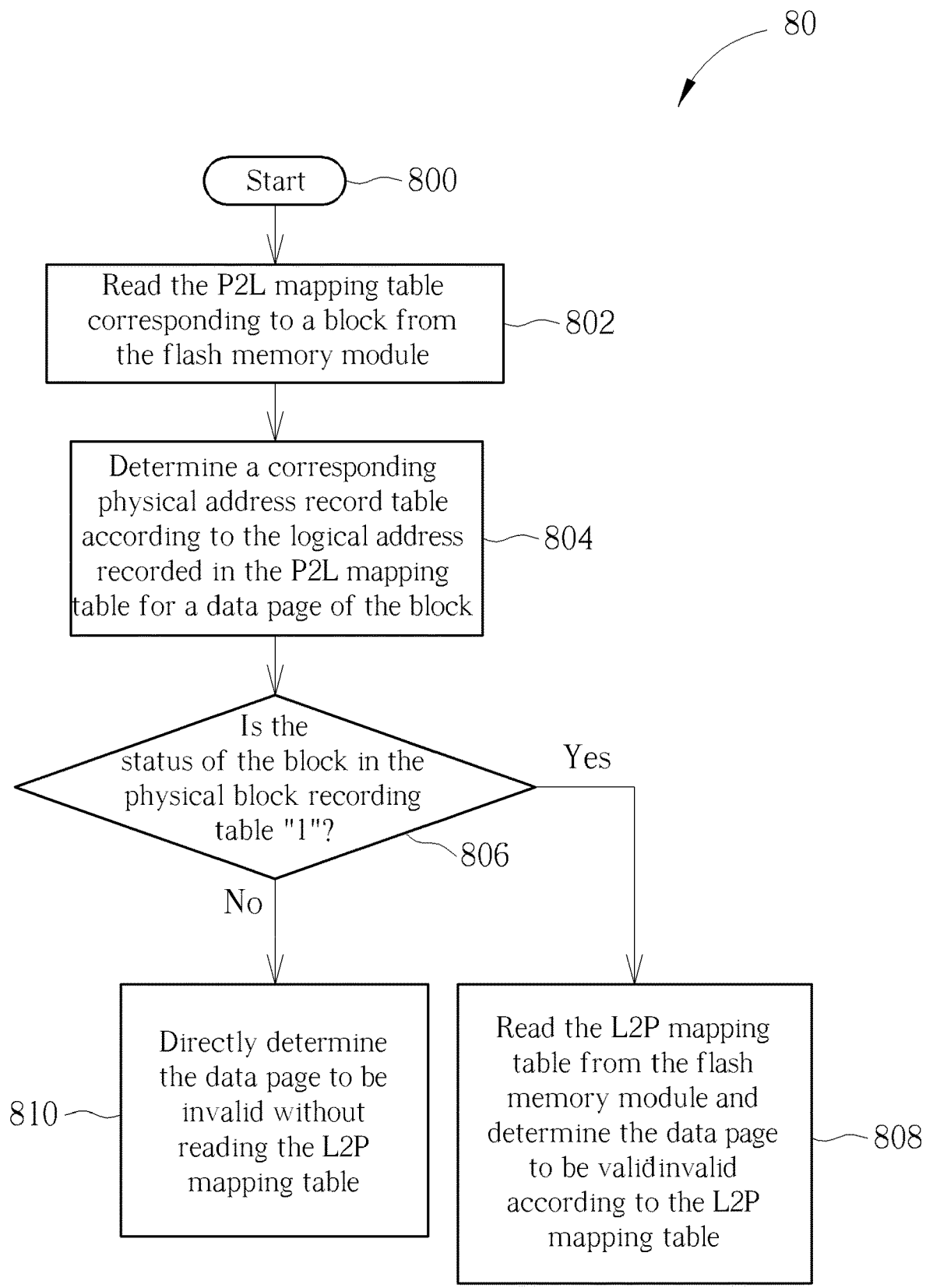
FIG. 8 is a flow chart showing a garbage collection operation according to an embodiment of the present invention.

FIG. 8 is a flow chart showing a garbage collection operation according to an embodiment of the present invention, in which the garbage collection operation is performed on the block B_0 shown in FIG. 4, and the correlation contents are described in the second to sixth embodiments as an example to facilitate understanding. In the step 800, the flow starts and the flash memory controller 110 is ready to perform garbage collection operations on the block B_0. In the step 802, the microprocessor 112 reads the P2L mapping table 400 of the block B_0 from the flash memory module 120. Next, in the step 804, the microprocessor 112 prepares to sequentially determine that each of the data pages P0~PN in the block B_0 is a valid data page or an invalid data page, and for each of the data pages P0~PN, the microprocessor 112 determines the corresponding logical address and the physical block recording table according to the P2L mapping table 400. For example, for the data page P0, the microprocessor 112 determines the corresponding logical address LBA_5 and the physical block recording table 320_1. For the data page P1 and its corresponding logical address LBA_500, the microprocessor 112 determines the corresponding logical address LBA_500 and physical block recording table 320_2, . . . , and so on.

Figure 6:
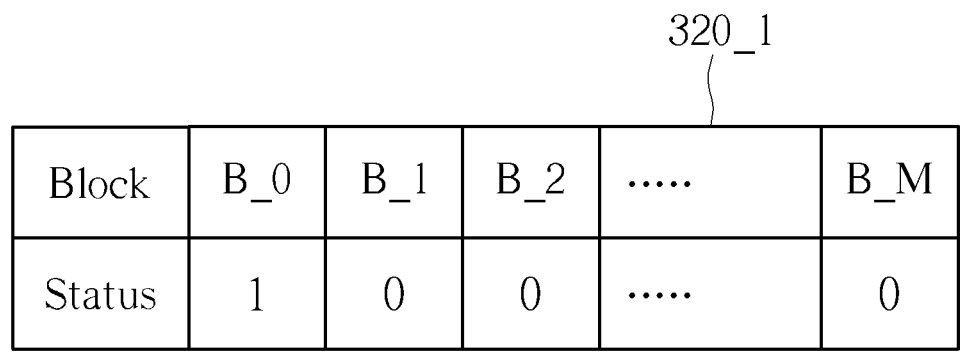
FIG. 6 is a diagram illustrating updating the physical block recording tables by using the updated L2P mapping table according to an embodiment of the present invention.
Figure 6:
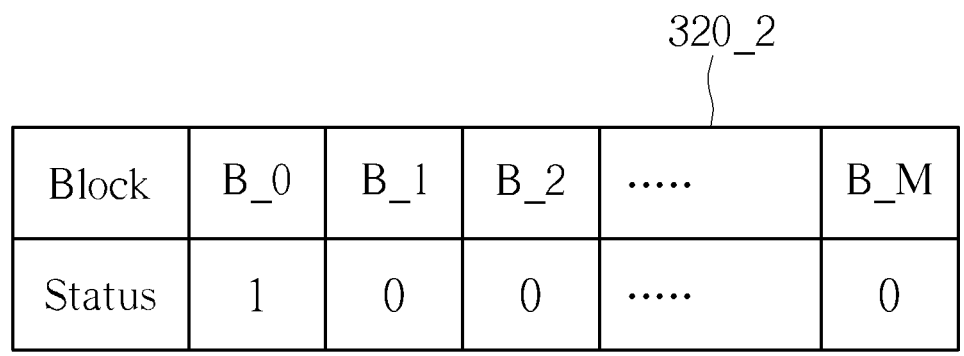

In the step 806, the microprocessor 112 determines whether the status of the block in the physical block recording table is "1", and if yes, the flow proceeds to the step 808 to read the L2P mapping table from the flash memory module 120 to determine the data page to be valid or invalid. If no, the process proceeds to the step 810 and directly determines the data page to be invalid without reading the L2P mapping table from the flash memory module. For example, the status of the block B_0 of the physical block recording table 320_1 shown in FIG. 6 is "1" for the data page P0 and the physical block recording table 320_1 determined in the step 804, and thus the processor 112 reads the corresponding L2P mapping table 310_1 from the flash memory module 120 and determines the data page P0 to be valid or invalid according to the contents of the L2P mapping table 310_1 and the contents of the block B_0 (or the contents of the P2L mapping table 400 of the block B_0). In this embodiment, since the L2P mapping table 310_1 also records that the logical data page address LBA_5 corresponds to the data page P0 of the block B_0, and thus the microprocessor 112 determines that the data page P0 is a valid data page. Next, since the status of the block B_0 of the physical block recording table 320_2 shown in FIG. 6 is "0" for the data page P1 and the physical block recording table 320_2 determined in the step 804, the microprocessor 112 does not need to read the corresponding L2P mapping table 310_2 from the flash memory module 120, and it is practical to directly determine that the data page P1 is an invalid data page. Next, the microprocessor 112 repeats the above operations until each of the data pages P0~PN in the block B_0 completes the determination of the valid/invalid data page.

Finally, when each of the data pages P0~PN in the block B_0 completes the determination of the valid/invalid data page, the microprocessor 112 moves all the valid data pages in the block B_0 to another block, and erases the block B_0 to release the available storage space. It is to be noted that the above erasing operation on the block B_0 is not performed immediately, but the block B_0 can be marked as invalid first and it is waited when the flash memory controller 110 is relatively idle to perform the erasing on the block B_0 operation.

As described in the flowchart of FIG. 8, the microprocessor 112 firstly refers to the physical block recording tables resident in the buffer memory 116 when the microprocessor 112 determines the valid/invalid data page for each of the data pages P0~PN and determines whether to read the corresponding L2P mapping table from the flash memory module 120 according to the record in the physical block recording table, and thus this embodiment avoids a lot of operations of invalidly reading the L2P mapping tables, so as to enhance the performance of the flash memory controller 110.

It is to be noted that, in the above embodiment, the physical block recording tables 310_1, 310_2 record the status of each of the blocks B0~B_M. However, in another embodiment of the present invention, in order to reduce the data volume of the physical block recording table to save the space of the buffer memory 116, the physical block recording table 900 can comprise states of a plurality of block groups, as shown in FIG. 9, in which each block group can comprise a plurality of blocks. For example, B_0~B_9 constitute a first block group, and B_10~B_19 constitute a second block group, and B_20~B_29 constitute a third block group, ... , and B_(M-9)~B_(M) constitute the last block group. Similar to the previous embodiment, the physical address recording table 900 records the status of each block group in the flash memory module 120, and is utilized to represent whether multiple L2P mapping tables of the corresponding block group records the physical address of the block group. The status of each block group is represented by two digits of one bit, wherein the digit value "0" indicates that the L2P mapping table does not records the physical address of any data page of a block in the block group, and the digital value "1" indicates that the L2P mapping table records the physical address of any data page of a block in the block group. Since those of ordinary skill in the art should understand how to apply the physical address recording table 900 in the flows of FIG. 2 and FIG. 8 after reading the above embodiments, details are omitted herein for the sake of brevity.

Briefly summarized, the method for accessing a flash memory module of the present invention can build a physical block recording table corresponding to each L2P mapping table, to indicate blocks whose physical addresses are recorded in each L2P mapping table by using a small amount of data, so as to reduce the ineffective reading of the L2P mapping table from the flash memory module 120 during the garbage collection to efficiently determine the data page to be valid or invalid, and enhance the efficiency of the flash memory controller 110.

Those skilled in the art will readily observe that numerous modifications and alterations of the device and method can be made while retaining the teachings of the invention. Accordingly, the above disclosure should be construed as limited only by the metes and bounds of the appended claims.

What is claimed is:

1. A method for accessing a flash memory module, comprising:
    building a plurality of physical block recording tables respectively corresponding to a plurality of logical address to physical address (L2P) mapping tables, wherein each physical block recording table records at least one block whose physical address is recorded in the corresponding L2P mapping table; and
    when a specific block within the flash memory module is under a garbage collection operation, for a data page of the specific block whose logical address is within a specific L2P mapping table of the plurality of L2P tables, referring to the corresponding physical block recording table to determine whether to read the specific L2P mapping table from the flash memory module, for determining the data page to be valid or invalid.

2. The method of claim 1, wherein the step of referring to the physical block recording table to determine whether to read the specific L2P mapping table from the flash memory module, for determining the data page to be valid or invalid comprises:
    when the physical block recording table indicates that the specific L2P mapping table has a physical address of the specific block, reading the specific L2P mapping table from the flash memory module and determining the data page to be valid or invalid based on the specific L2P mapping table; and
    when the physical block recording table indicates that the specific L2P mapping table does not have the physical address of the specific block, determining the data page to be invalid.

3. The method of claim 2, wherein the step of determining the data page to be invalid when the physical block recording table indicates that the specific L2P mapping table does not have the physical address of the specific block comprises:
    when the physical block recording table indicates that the L2P mapping table does not have the physical address of the specific block, directly determining the data page to be invalid without reading the specific L2P mapping table from the flash memory module.

4. The method of claim 1, wherein the physical block recording tables is stored in a memory of a flash memory controller, and when the flash memory controller updates at least a portion of the L2P mapping tables, at least a portion of the physical block recording tables is updated in accordance with the updated contents of the L2P mapping table(s).

5. The method of claim 1, wherein each of the physical block recording tables records status of a plurality of blocks in the flash memory module, and the status of each block records whether the corresponding L2P mapping table has a physical address of any data page in the specific block.

6. The method of claim 5, wherein the specific block comprises a plurality of pages; the status of each block is represented by a bit, and the two digit values of the bit are utilized to represent whether the corresponding L2P mapping table has a physical address of any data page in the specific block.

7. The method of claim 1, wherein each of the physical block recording tables records status of a plurality of block groups in the flash memory module, each block group comprises a plurality of blocks, and the status of each block group records whether the corresponding L2P mapping table has a physical address of any data page of a block in the block group.

8. The method of claim 7, wherein each of the blocks within the block group comprises a plurality of pages; the status of each block group is represented by a bit, and the two digit values of the bit are utilized to represent whether the corresponding L2P mapping table has a physical address of any data page of a block in the block group.

9. A flash memory controller, wherein the flash memory controller is utilized to access a flash memory module, and the flash memory controller comprises:
a read-only memory (ROM), for storing a code;
a microprocessor, for executing the code to control access to the flash memory module; and
a memory, for storing a plurality of physical block recording tables respectively corresponding to a plurality of L2P mapping tables, wherein each physical block recording table records at least one block whose physical address is recorded in the corresponding L2P mapping table;
wherein when a specific block within the flash memory module is under a garbage collection operation, for a data page of the specific block whose logical address is within a specific L2P mapping table of the plurality of L2P tables, referring to the corresponding physical block recording table to determine whether to read the specific L2P mapping table from the flash memory module, for determining the data page to be valid or invalid.

10. The flash memory controller of claim 9, wherein when the physical block recording table indicates that the L2P mapping table has a physical address of the specific block, the microprocessor reads the specific L2P mapping table from the flash memory module and determines the data page to be valid or invalid based on the specific L2P mapping table; and when the physical block recording table indicates that the specific L2P mapping table does not have the physical address of the specific block, the microprocessor determines the data page to be invalid.

11. The flash memory controller of claim 10, wherein when the physical block recording table indicates that the specific L2P mapping table does not have the physical address of the specific block, the microprocessor directly determines the data page to be invalid without reading the specific L2P mapping table from the flash memory module.

12. The flash memory controller of claim 9, wherein when the microprocessor updates at least a portion of the L2P mapping tables, at least a portion of the physical block recording tables is updated in accordance with the updated contents of the L2P mapping table together(s).

13. The flash memory controller of claim 9, wherein each of the physical block recording tables records status of a plurality of blocks in the flash memory module, and the status of each block records whether the corresponding L2P mapping table has a physical address of any data page in the specific block.

14. The flash memory controller of claim 13, wherein the specific block comprises a plurality of pages; the status of each block is represented by a bit, and the two digit values of the bit are utilized to represent whether the corresponding L2P mapping table has a physical address of any data page in the specific block.

15. The flash memory controller of claim 9, wherein each of the physical block recording tables records status of a plurality of block groups in the flash memory module, each block group comprises a plurality of blocks, and the status of each block group records whether the corresponding L2P mapping table has a physical address of any data page of a block in the block group.

16. The flash memory controller of claim 15, wherein each of the blocks within the block group comprises a plurality of pages; the status of each block group is represented by a bit, and the two digit values of the bit are utilized to represent whether the corresponding L2P mapping table has a physical address of any data page of a block in the block group.

17. An electronic device comprising:
a flash memory module; and
a flash memory controller, for accessing the flash memory module;
wherein the flash memory controller builds a plurality of physical block recording tables respectively corresponding to a plurality of L2P mapping tables, wherein each physical block recording table records at least one block whose physical address is recorded in the corresponding L2P mapping table; and when a specific block within the flash memory module is under a garbage collection operation, for a data page of the specific block whose logical address is within a specific L2P mapping table, referring to the corresponding physical block recording table to determine whether to read the specific L2P mapping table from the flash memory module, for determining the data page to be valid or invalid.

18. The electronic device of claim 17, wherein when the physical block recording table indicates that the L2P mapping table has a physical address of the specific block, the flash memory controller reads the specific L2P mapping table from the flash memory module and determines the data page to be valid or invalid based on the specific L2P mapping table; and when the physical block recording table indicates that the specific L2P mapping table does not have the physical address of the specific block, the flash memory controller directly determines the data page to be invalid without reading the specific L2P mapping table from the flash memory module.

* * * * *